May 26, 1959

M. E. TOBY 2,887,837

APPARATUS FOR RECEIVING, CONVEYING, WEIGHING AND BAGGING ARTICLES

Filed Jan. 4, 1954

INVENTOR
MAX E. TOBY

BY
ATTORNEYS

INVENTOR
MAX E. TOBY
BY Gardner & Zimmerman
ATTORNEYS

May 26, 1959  M. E. TOBY  2,887,837
APPARATUS FOR RECEIVING, CONVEYING, WEIGHING
AND BAGGING ARTICLES
Filed Jan. 4, 1954  4 Sheets-Sheet 3

INVENTOR
MAX E. TOBY
BY
ATTORNEYS

INVENTOR
MAX E. TOBY
BY
Gardner & Zimmerman
ATTORNEYS

United States Patent Office 2,887,837
Patented May 26, 1959

2,887,837

APPARATUS FOR RECEIVING, CONVEYING, WEIGHING, AND BAGGING ARTICLES

Max E. Toby, San Francisco, Calif., assignor to Package Enterprises, Inc., Oakland, Calif., a corporation of California Application January 4, 1954, Serial No. 402,109

17 Claims. (Cl. 53—258)

The present invention relates to article handling apparatus, and is more particularly directed to unitary apparatus which may receive an article or stack of articles at a receiving station, move the articles to a remote discharge station and deposit them on a scale platform, and then pack the articles into a bag or similar container. The apparatus and method as disclosed herein may be discussed in terms of handling and bagging stacks of meat slices, but it will become apparent that such apparatus or method may be used in connection with other unrelated products with little or no change in construction or mode of operation.

In my prior application, Serial No. 250,370, filed October 8, 1951, now Patent No. 2,708,539, entitled Apparatus and Method of Receiving and Bagging Articles, there is disclosed mechanism capable of performing certain of the above described operations. Primarily, my prior invention included a rotor on which a stack of slices may be deposited, means for rotating the rotor through a prescribed number of degrees, and plunger means for pushing the stack off of the rotor and into a bag. Such apparatus has and continues to receive favorable reception by the trade, but the particular mechanism was not designed to permit convenient automatic weighing of the slices. In this latter regard, it should be pointed out that the weighing of the respective stacks should be performed as close as possible to the slicer or other delivering mechanism, for if the articles being delivered are not of correct weight, the delivering mechanism should be promptly adjusted before an excessive number of articles have been delivered. Also, by placing the weighing apparatus adjacent the slicer or other delivery mechanism, a single operator can check the weights and handle the usual automatic feed type of slicer.

It is therefore an object of the present invention to provide compact apparatus for receiving, weighing and bagging articles in which the entire operation is automatic except for the placing of the bags on a mandrel.

Another object of my invention is to provide apparatus of the character described including automatic means for receiving a stack of articles, moving said stack and weighing the same, and then placing the weighed stack into a bag or other container.

A further object of the invention is to provide an improved method of receiving and bagging articles in which the articles are weighed prior to the bagging thereof, and which insures rapid though gentle handling of the respective stacks.

A still further object of this invention is to provide an improved mandrel mechanism permitting easy insertion of a bag thereon while still insuring ready entry of the articles into the bag.

Another object of the invention is to provide novel apparatus for removing a stack of articles from a moving rotor and depositing the same on a stationary scale platform without disturbing the alignment of the stack and without in any way interfering with the accurate weighing of the stack.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings.

Figure 1:
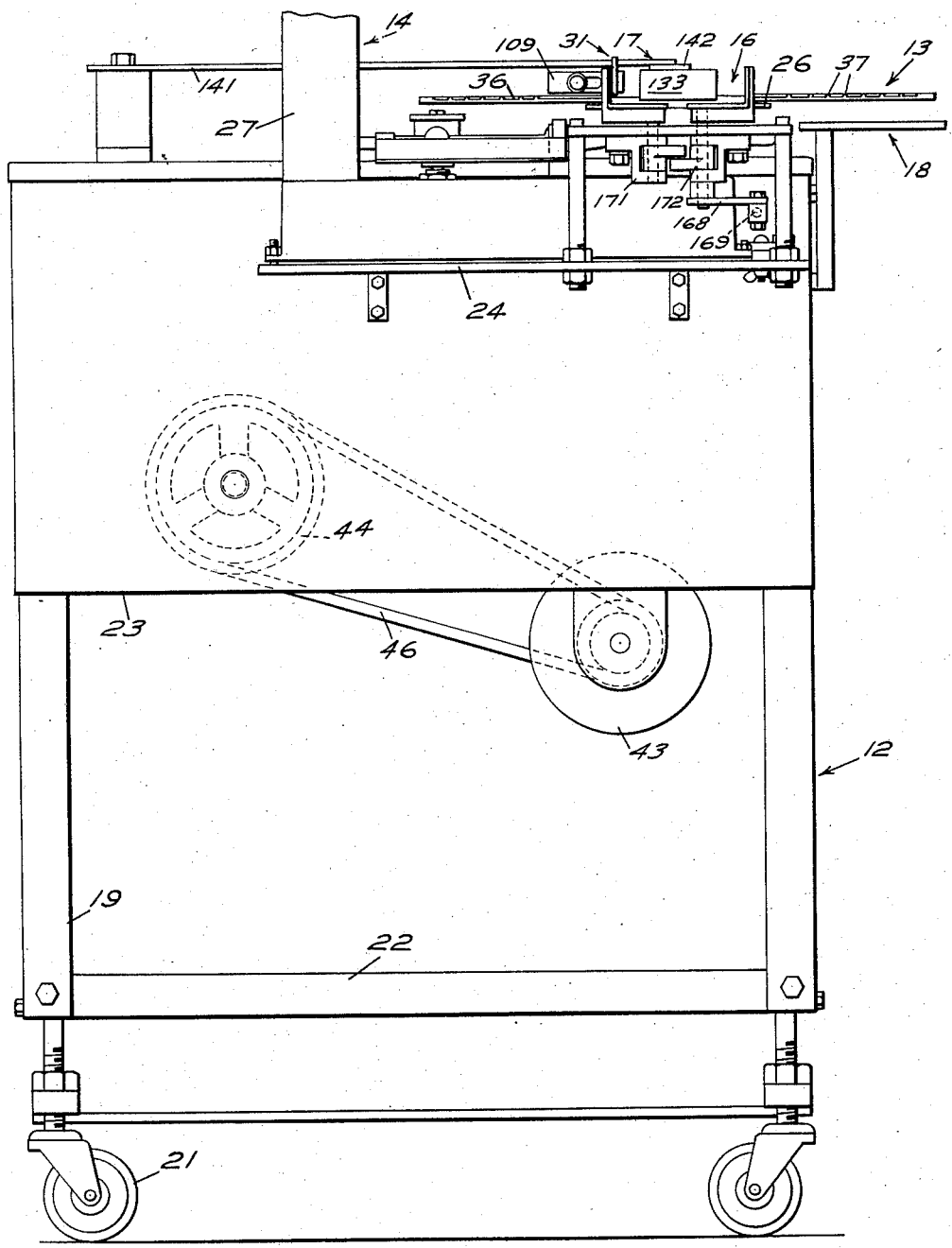
Figure 1 is a side elevational view of the apparatus of the present invention.

As hereinabove suggested, the apparatus of the present invention is particularly well adapted for the handling of a stack of meat or cheese slices such as may be delivered from an intermittent type of slicing machine. An intermittent slicer is arranged to cut a predetermined number of slices and then cease slicing for another selected interval. The present apparatus includes means for receiving the respective slices from the slicer and then conveying the formed stack from subjacent the slicer to a scale platform where the stack may be weighed during the idling period of the slicer. The apparatus further includes mechanism for then moving the weighed stack from the scale platform into a bag or similar container. It will be appreciated that intermittent types of slicers may operate in the range of 240 revolutions per minute, and it is therefore believed clear that the entire operation must be synchronized and accurate to insure proper transfer, weighing and bagging of the respectively formed stacks.

Referring now to the exemplary apparatus illustrated in the drawings, in broad terms there is provided a frame structure 12, a stack receiving member 13 movable on the frame, scale mechanism 14, a bag mandrel 16, and plunger means 17 for urging the stacks into a bag placed on the mandrel. In operation, a slicer (not shown) or other article delivery mechanism is positioned adjacent what may be termed the receiving end 18 of the structure so that the slices may be deposited upon receiving member 13. After the requisite number of slices have been deposited thereon and the slicer passes into its idling cycle, the receiving member is moved to adjacent the scale 14 and the stack deposited thereon. The plunger mechanism 17 then moves the stack from the scale into a bag which had previously been placed on the mandrel 16, and causes the bag to be removed from the mandrel and fall onto a takeaway conveyor or other mechanism having no bearing on the instant invention.

Frame structure 12 is arranged to support the operating mechanism above mentioned and may include a plurality of legs 19 mounted on vertically adjustable casters 21, cross bracing 22, and a housing 23 in which the bulk of the drive mechanism is disposed. As is well known in the art, the housing side walls are preferably removable to permit access to the drive mechanism.

Extending laterally from a side wall of the housing adjacent the stack receiving end 18 is a horizontally disposed shelf 24 on which the scale mechanism 14 may be supported. No particular type of scale is claimed as part of this invention, and as such scales are well known, it is sufficient to state that the scale is provided with a horizontal weighing platform 26 to which the respective stacks are transferred by the stack receiving member 13, and from which such stacks are displaced into the bags. The scale will usually also include a vertical portion 27 containing the scale indicia and pointer, not shown. Thus, as a stack is placed on the platform 26, an operator can readily observe if such stack meets the minimum and maximum weight standards.

As above mentioned, the article receiving member 13 receives the articles adjacent the front end of the apparatus and then passes over the scale platform at which time a wiper member, generally indicated by the numeral 31 intercepts the forward movement of the articles and causes them to fall upon the scale platform 26. The mechanism and mode of operation for performing the foregoing will now be discussed in detail. Member 13 is preferably constructed in the form of diametrically opposed and horizontally disposed vanes 36 having a plurality of concentric arcuate ridges or corrugations 37 on the upper surface thereof for a purpose later to be discussed. The vanes are mounted for rotation on a vertical shaft 39 by means of a collar or sleeve arrangement 41 depending from the lower surface of the innermost portions of the vanes and journalled on the shaft. Thus, when sleeve 41 is rotated, vanes 36 will be correspondingly rotated, and as will be later explained, the sleeve is caused to intermittently rotate through an arc of 180 degrees whereby each of the vanes will be alternately positioned adjacent the receiving end 18 of the apparatus for receiving a stack of slices on the upper surface thereof. It will be understood that the horizontal plane defined by the movement of the vanes is slightly above the plane defined by the scale platform 26 so that as the vanes are rotated, they will pass directly over the platform.

Means are provided for moving the sleeve 41 and its attached vane members through their above stated rotational cycle. More specifically, each cycle is arranged to be commenced upon receiving an impulse from the article supply mechanism whereby the instant apparatus will remain at rest until a proper stack of meat slices has been deposited upon one of the vanes. While constituting no part of the present invention, in practice, a micro-switch is placed on a slicing machine, the switch being actuated when the last slice of a stack has been cut. This switch is operatively connected to a solenoid 42 which is energized thereby to start the operational cycle of the vanes and the other mechanism of the present apparatus.

Power for driving the apparatus may be supplied by a motor 43 which drives a sheave 44 through a V-belt 46. Sprocket or sheave 44 is connected to a horizontal worm 47 whose shaft ends are journaled in a pair of blocks 48, the worm being in driving connection with a worm gear 49. Carried on the upper horizontal surface of worm gear 49 is a lower clutch member 51 provided with teeth 52 which are selectively engageable and spaced from similar teeth 53 of an upper clutch member 54. The upper clutch member 54 is mounted for axial movement on a vertical shaft 56, and as will be later described, operation of solenoid 42 effects engagement of the clutch members for a single revolution. Thus, when the solenoid is energized, means are provided for causing the upper clutch member 54 to descend and engage the lower clutch member 51 whereby the constantly rotating latter member may drive the former. However, at the end of a single revolution, the upper clutch member will once more be raised to its upper inoperative position.

Figure 3:
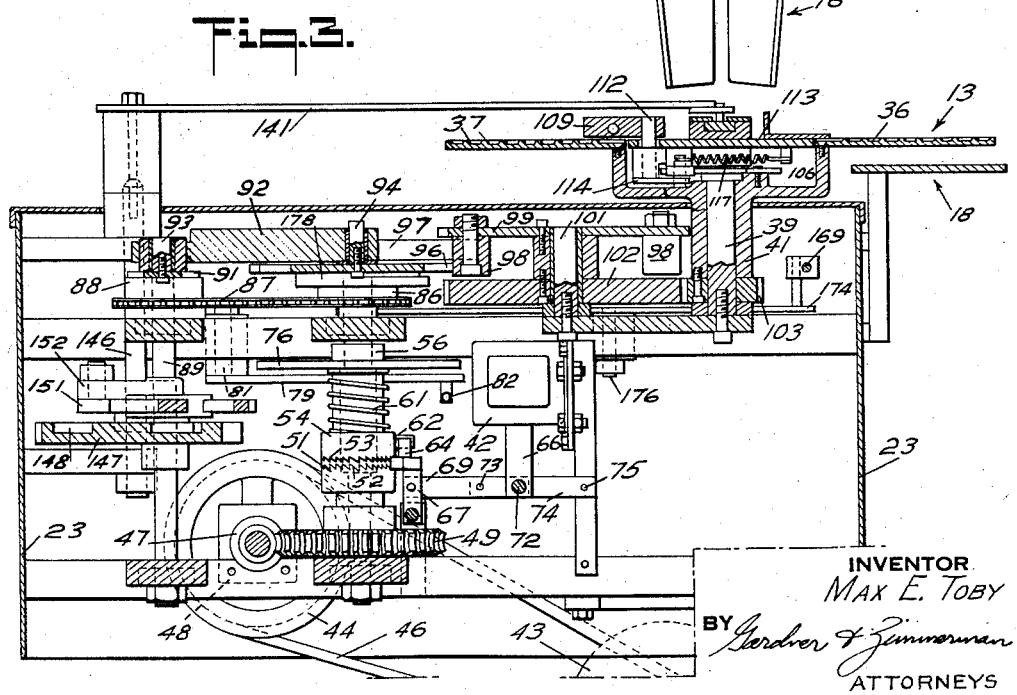
Figure 3 is a cross-sectional elevational view taken substantially in the plane indicated by line 3—3 of Figure 2.
Figure 4:
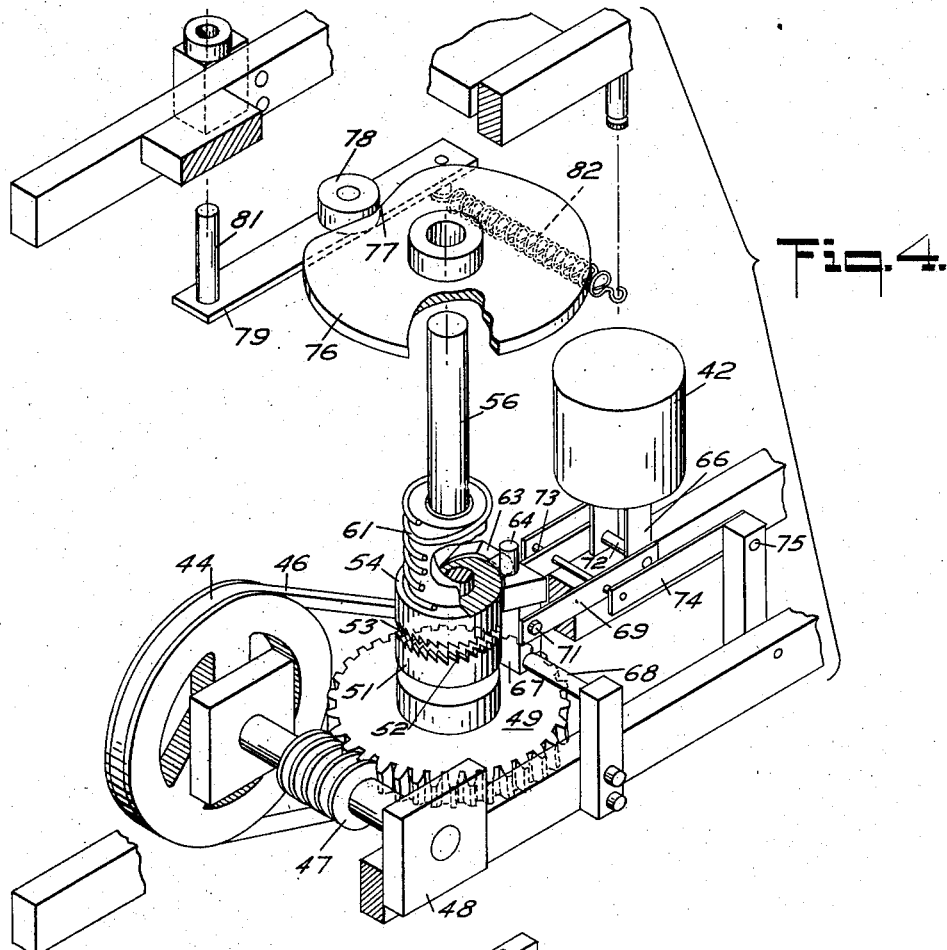
Figure 4 is an exploded perspective view illustrating the clutch and clutch actuating mechanism of the apparatus.

The foregoing clutch arrangement is best indicated in Figures 3 and 4 of the drawings wherein it will be noted that clutch member 54 is normally urged to its operative position by a compression spring 61. However, notwithstanding the spring action, the clutch members are normally disposed in spaced relationship through the action of a dog or lug 62 extending radially from member 54 riding on an upwardly inclined cam 63. Cam 63 is further provided with a stop 64 which limits the degree of rotation of member 54. Thus, to permit clutch engagement, cam 63 must be moved away from its engagement with dog 62 and permit the combination of gravital and spring forces to lower the upper clutch member into its operative position.

Movement of cam 63 is controlled by solenoid 42 which, when actuated as previously discussed, raises its plunger 66 which tilts the cam away from the clutch members. It will be seen that cam 63 is carried on the upper end of a block 67 whose lower end is journalled on a horizontal pivot pin 68. A pair of parallel arms 69 are pivotally connected at one end thereof to an intermediate portion of block 67 by a pin 71 and at the other end thereof to the distal end of plunger 66 by a pin 72. The arms 69 are limited to rocking movement by being journalled on a pin 73 carried by brackets 74 pivoted to the frame structure as indicated at 75. Thus it should be clear that as the solenoid plunger is moved upwardly, arms 69 will rock about pin 73 effecting a clockwise rotation of block 67 and cam 63 about pin 68 (as viewed in Figure 3), the arrangement of the parts being such as to permit lineal movement of the plunger. This will permit clutch member 54 to engage member 51 whereby shaft 56 will be rotated. However, as the shaft starts its rotation, the solenoid will return to its normal position and cam 63 will likewise return to its clutch intercepting position whereby at the end of a single revolution, clutch dog 62 will ride upwardly on cam 63 and strike the cam stop 64.

In connection with the foregoing, it might be expected that the inertia of the rotating shaft 56 and its associated clutch member 54 would result in a hammering effect when the dog strikes the stop. To prevent such an effect, I provide a cam 76 on shaft 56, said cam having a recessed portion 77 of substantially V-shaped configuration on a point of its periphery corresponding to the rest position of the clutch. A cam roller or follower 78 is journalled on an intermediate portion of an arm 79 which is pivotally supported at one end on a vertical pivot shaft 81, and whose other end is attached to a spring 82 which keeps the roller in engagement with the cam periphery. During the major portion of rotation of shaft 56 and cam 76, the roller will be riding upon the circular portion of the cam periphery. Then, as they are completing their single revolution, the roller will ride downwardly on one of the slopes of cam portion 77 until it reaches the innermost recess of such portion at which time the clutch dog strikes the stop. In this manner, hammering will be effectively prevented for in order to permit further movement of the shaft, the cam would have to work against the cam follower. It will also be appreciated that the sloping arrangement of cam portion 77 will assist the clutch dog to ride upwardly upon the cam 63 to insure completion of a full revolution of the shaft 56.

Figure 6:
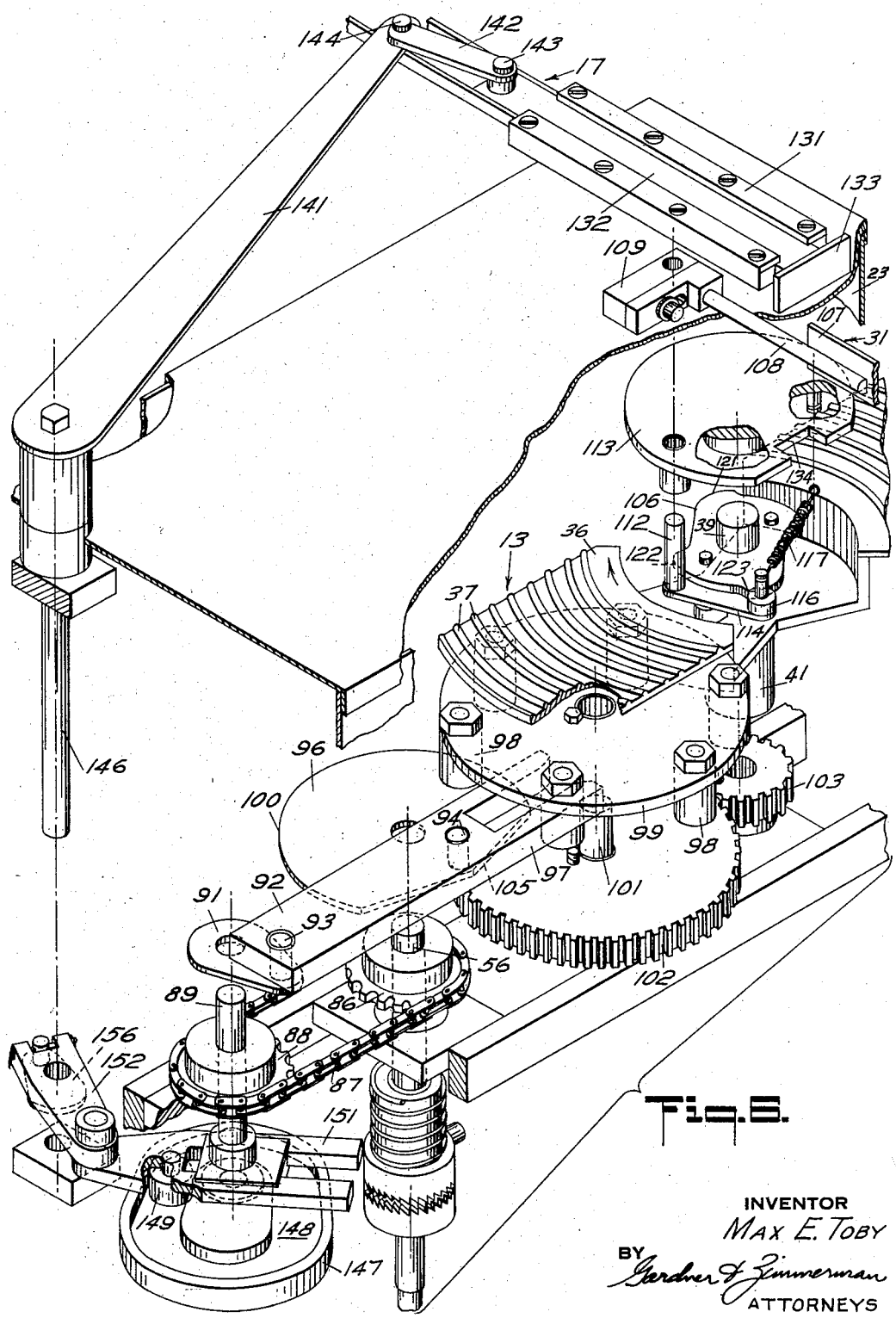
Figure 6 is an exploded perspective view of the main operating features employed in the instant apparatus.

Mounted on shaft 56, above the clutch control cam 76, is a sprocket 86 whose chain 87 is operatively connected to a similar sprocket 88 carried on a vertical shaft 89 disposed in parallel relationship to shaft 56. Thus, shaft 89, together with shaft 56, will rotate through a single revolution upon solenoid actuation. As will be later described in detail, shaft 89 supplies the rotary power for driving the plunger mechanism, and likewise is operatively connected to the vanes 36 for actuating the latter. Referring particularly to Figure 6 of the drawings, it will be seen that shaft 89 carries an eccentric arm 91 whose distal end is pivotally attached to a bifurcated yoke member 92 by a pin 93. An intermediate portion of the member 92 is pivotally attached to a pin 94 carried on a plate 96 which is mounted on shaft 56, and the distal furcations 97 of the member are arranged to sequentially engage a plurality of freely journalled rollers 98 which depend from a disk 99. As here shown, six equally spaced rollers are provided, and the arrangement of the parts is such that for each revolution of shaft 89, yoke member will be brought into engagement with one of the rollers to move disk 99 through one-sixth of a revolution with its shaft 101, and then release the roller in preparation for engagement with the next adjacent roller. In general, the yoke and roller arrangement will produce a Geneva motion to the disk 99 and its associated shaft 101. To prevent overrunning of disk 99, at the end of its sixty degrees of rotation, the roller will engage a cam surface 100 on plate 96, a cut out portion 105 fitting between the rollers during normal rotation of the disk.

Rotation of shaft 101 is imparted to the vane drive collar 41 in the following manner. Adjacent the lower ends of the shaft 101 and collar 41 is provided a pair of intermeshing gears or sprockets 102 and 103, and attention is directed to the fact that sprocket 102 is three times as large as sprocket 103. In this manner, while shaft 101 is being rotated through one-sixth of a revolution, collar 41 and its attached vanes will be rotated through an arc of 180 degrees so that the respective vanes will be alternately positioned for receiving articles thereon.

Thus far in the description of the illustrated mechanism, apparatus has been described which will intermittently carry an article or a stack of articles along a horizontal rotary path over the scale platform 26 upon solenoid actuation. However, as the scale platform is positioned subjacent the path of the vanes and substantially intermediate the movement thereof, i.e., approximately 90 degrees from the receiving end of the apparatus, means must be provided for transferring the articles from the vanes to the scale platform during movement of the vanes.

Figure 2:
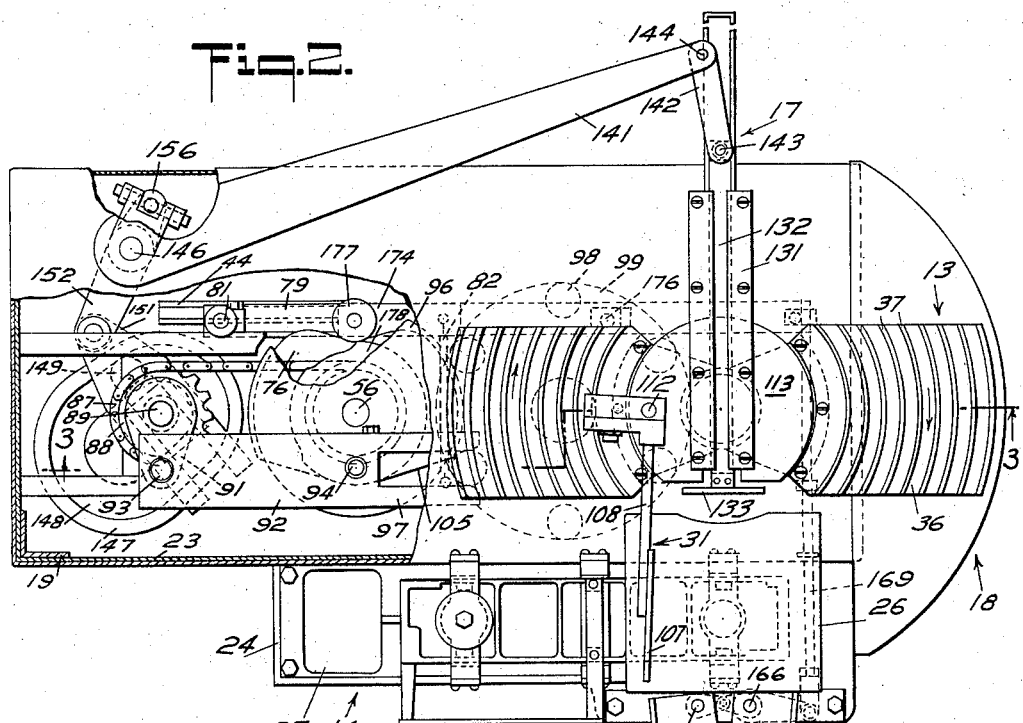
Figure 2 is a top plan view of the apparatus shown in Figure 1, portions of the mechanism being broken away in order to disclose internal features of construction.

Wiper member 31 is utilized for the foregoing operation, and it will be appreciated that if a stationary article-intercepting element is disposed in the path of movement of the articles, the latter will be stopped relative to the moving vane and dropped onto the scale platform. Such an arrangement may be adequate where a single article is being conveyed on the vane, but in the case of a stack of meat slices or similar articles, the impact of the stack in suddenly striking an immobile object would most certainly disrupt the alignment of the stack, and prevent subsequent automatic bagging thereof. Therefore, in accordance with the teachings of the present invention, upon commencement of an operative cycle, when the vane starts its normal clockwise rotation (as viewed in the drawings), the wiper member starts a counterclockwise rotation until it approaches the oncoming vane. At this time, the wiper is caused to reverse its direction and rotate clockwise slightly in advance of the leading edge of the vane, but at a slightly lesser speed, until the vane approaches the scale platform whereupon the articles on the vane will engage the wiper and be smoothly stopped and gently deposited on the platform, the guides 37 on the vanes facilitating such removal. Also, when the wiper reaches the end of its travel, substantially as shown in Figure 2, it is given a slight but abrupt continued forward advance to insure that it will be out of contact with the articles on the scale platform when such articles are being weighed.

The foregoing action of wiper member 31 is primarily controlled by means of a cam 106 carried on the vane drive collar 41. Actually, by virtue of the fact that the collar only rotates through one half of a revolution, cam 106 is provided with two symmetrical cam surfaces, each of such surfaces being alternately utilized. Wiper member 31 includes a wiper blade 107 mounted at one end of an arm 108, the latter being carried in a block 109. This block is attached to a vertical shaft 112 which passes through a stationary plate 113 lying in the plane of and positioned between the vanes, and is attached at its lower end to one end of an actuating arm 114. A cam roller 116 is journaled on the other end of arm 114 and is maintained in engagement with the periphery of cam 106 by a spring 117. In this manner, as roller 116 follows the cam surface, arm 114 and shaft 112 will be oscillated, imparting corresponding movement to arm 108 and its attached wiper blade 107.

Each half of cam 106 is provided with three distinct peripheral portions designated by the numerals 121, 122 and 123 respectively. When the roller is in engagement with portion 121, the wiper is rotated counterclockwise; when it is in engagement with portion 122, the wiper is rotated clockwise at a relatively slow speed; and when the roller engages the sharp portion 123, the wiper will be abruptly advanced through a few degrees of clockwise rotation to avoid permanent contact with the stack on the scale platform.

With the stack deposited upon the scale platform in the above described manner, the plunger means 17 are actuated to engage the stack on said platform and remove the stack therefrom. As will be later described, when the stack is moved from the scale platform, it will be forced into the open end of a bag, but before considering the details of the bag mandrel, the mechanism and operation of the plunger means will first be described.

Plunger means 17 includes a longitudinally extending guide member 131 which overlies and directs plate 113 at substantial right angles to the normal longitudinal axis of the vanes. Mounted for axial sliding movement in member 131 is a plunger arm 132 which carries at one end thereof a pusher plate 133 whose outer surface is adapted to engage the slices on the scale platform. It will be noted that the stationary plate 113 is provided with a notched portion 134 in which the lower portion of the pusher plate is disposed when in its inoperative position, so that such lower portion will be positioned substantially immediately adjacent the upper surface of the scale platform when the plunger is operated to engage all of the slices in the stack.

Plunger arm 132 is advanced and retracted by means of an oscillating lever 141, a short link 142 being pivotally connected at the ends thereof to the distal end of arm 132 and one end of lever 141 by pins 143 and 144 respectively. As arm 132 is restricted to axial movement, it will be clear that oscillation of lever 141 in a horizontal plane will result in fore and aft movement of arm 132 and its associated pusher plate.

Lever 141 is attached to a vertical shaft 146 which receives its oscillatory movement in the following manner. Referring particularly to Figures 3 and 6, it will be seen that shaft 89, which rotates a full revolution in each cycle, carries a generally oval cam 147 having an inner trackway 148 of similar shape. A cam follower 149 is disposed within said trackway, said follower depending from and being pivotally attached to a bracket 151 which is capable of transverse movement relative to the axis of shaft 89 as the follower rides in its trackway. One end of bracket 151 is pivotally connected to a short lever 152 on which the shaft 146 is mounted. Thus, as follower 149 follows the trackway 148, lever 152 will swing back and forth and result in the aforesaid advance and retraction of the pusher plate 133. In order to control the length of movement of the pusher plate, an eccentric 156 may be utilized which adjustably limits the degree of rotation of the plunger drive shaft 146. The cam is radially oriented with the remaining portions of the apparatus so that no movement of the pusher plate is started until after the vanes have substantially completed their arcuate movement.

Figure 5:
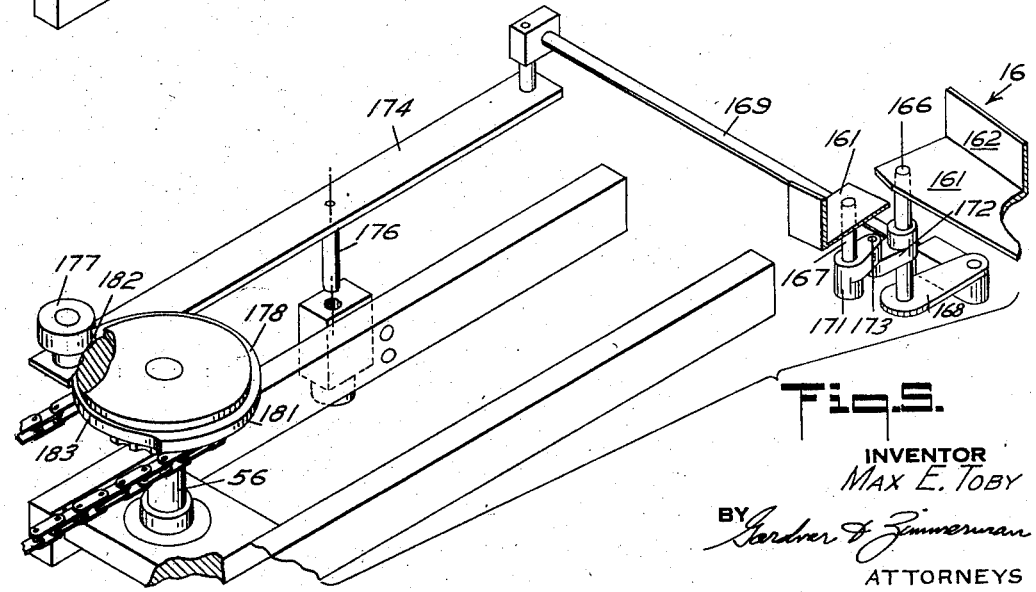
Figure 5 is an exploded perspective view of portions of the bag mandrel and its operating mechanism.

If desired, when the plunger advances to push the stack off of the scale platform, the stack could be dropped onto a conveyor, into a box, or any other desired operation could be performed. However, as an important feature of the present invention, the stack is deposited into a bag which had previously been placed on the bag mandrel 16 when the apparatus was not going through an operative cycle. As best seen in Figures 2 and 5 of the drawings, the bag mandrel is positioned in alignment with the axis of plunger arm 132 and the scale platform, and immediately outboard of the latter. Preferably, the mandrel per se includes a pair of cooperating elements, each having a horizontal stack-supporting portion 161 and an outward vertical restraining wall 162. As will be understood, a bag is manually positioned over the cooperating mandrel elements, with the open end of the bag adjacent the outer edge of platform 26. As will be noted in Figure 2, the two elements are normally disposed in outward converging relationship so that a bag may be readily placed thereon. However, before the stack is moved into the bag, it will be necessary to "open" the mandrel whereby the walls 162 will force the bag into its full open position to permit insertion of the stack therein. Also, near the end of the pusher plate stroke, it is also desirable to permit slight closing of the mandrel elements to facilitate the then filled bag to be more readily removed.

The mandrel mechanism includes a pair of pins 166 and 167 attached to the under surface of portions 161 adjacent the innermost ends thereof. Pin 166 is carried on an eccentric crank 168 which may be oscillated by a rod 169. As rod 169 is moved, pin 166 will be rotated to move its mandrel element in one direction, while pin 167 is caused to rotate in a contra direction due to the links 171 and 172 and their intermediate pivot 173, and thereby the mandrel elements may be selectively opened or closed, depending upon the direction of movement of the actuating rod. Rod 169 is moved by an arm 174 which is mounted on a pivot pin 176 intermediate its ends for oscillatory movement. One end of arm 174 rotatably carries a cam follower 177 in engagement with the periphery of a cam 178 which controls the movement of arm 174, and consequently that of the mandrel elements as well. Cam 178 is carried on shaft 56 and therefore goes through a complete revolution during every operative cycle of the apparatus and is provided with three peripheral portions which are sequentially engaged with cam follower 177. When the follower engages the outermost portion 181 of the cam, the mandrel elements will be fully closed or in their bag-receiving position. With the follower in engagement with the innermost portion 182, the mandrel will be fully open, and as the intermediate portion 183 is rotated into engagement with the follower, the mandrel will be slightly closed to permit release of the filled bag from the mandrel. It will be understood that the stroke of the pusher plate 133 is sufficiently long to cause the outermost end of the stack to engage the bag bottom and push the filled bag off of the mandrel elements.

Briefly going through an operational cycle of the apparatus, it will be recalled that one of the vanes 36 is positioned adjacent the receiving end of the machine, the plunger 17 is retracted, the wiper is disposed adjacent an edge of the scale platform, and the mandrel is in its closed or bag-receiving position, all as indicated in Figure 2 of the drawings. Upon actuation of the solenoid, as when a full stack of slices has been deposited on the vanes, plunger 66 is raised, causing engagement of clutch 54 with clutch 51 and rotating the former through one complete revolution. During this revolution, rotation of shaft 56 is imparted to the vanes through member 92, rollers 98, and gears 102, 103, causing the vane to rotate 180 degrees. At the same time, the mandrel opens resulting in a firm engagement with the bag, and wiper blade 107 moves against the rotation of the vanes, and then with such rotation, but at a slower speed, causing the stack to be deposited upon the scale platform. Then the plunger advances, forcing the stack from the scale platform and into the bag, the bag mandrel slightly closing near the end of the plunger stroke to facilitate removal of the filled bag from the mandrel elements.

From the foregoing description, both the details of construction and the method outlined herein should be apparent. It will be expected that numerous modifications can be made to accommodate particular articles without departing from the spirit of the following claims.

What is claimed is:

1. Apparatus of the character described comprising a horizontally disposed article-supporting member, means for intermittently moving said member along a prescribed path in a horizontal plane, an article-intercepting element overlying said member and extending generally transversely of said path and arranged to engage and stop movement of an article on said member as the latter passes subjacent said element, and means for moving said element along said path with movement of said member but at a slower speed whereby said member will pass subjacent said element.

2. Article handling apparatus including a member having a substantially flat horizontal upper surface on which an article may be placed, means for intermittently moving said member along a prescribed path in a substantial horizontal plane, an article-intercepting element substantially overlying said horizontal plane and extending generally transversely to said path intermediate the ends of the latter, and means for moving said element along an intermediate portion of said path and at a lesser speed than the speed of said member.

3. Apparatus of the character described comprising a vane having an upper surface including a trailing edge on which an article may be placed, means for rotating said vane about a vertical axis horizontally spaced from said surface and along an arcuate horizontal path of prescribed length, a wiper element disposed above said vane surface and extending transversely of an intermediate portion of said path of movement of said vane, and means for rotating said wiper element along a path overlying an intermediate portion of the path of said vane and at a slower speed than the rotation of said vane whereby an article on said vane will be intercepted and slidably displaced off from the trailing edge of said vane in said intermediate portion of said vane path.

4. Apparatus of the character described comprising a pair of diametrically opposed vane members each having a horizontal upper surface on which an article may be supported and a leading and trailing edge, means for intermittently rotating both of said vanes about a vertical axis through approximately one-half of a revolution, a wiper element lying vertically above a horizontal plane defined by said vane surfaces and extending generally radially of the path of movement of said vanes and positioned so that said vane members will alternately pass thereunder, means for rotating said wiper element about a vertical axis through an arc of less than 180 degrees, cam means for causing said element to rotate in a contra direction to the rotation of said vanes upon initial rotation of the latter and to rotate in the same direction as the rotation of said vanes as one of said vanes approaches said wiper, and said wiper element rotating at a lesser speed than the rotational speed of said vanes whereby one of said vanes will pass substantially completely under said wiper element so as to cause an article carried on said vanes to fall from the trailing edge thereof.

5. Apparatus as set forth in claim 4 in which said cam means causes said wiper element to suddenly accelerate through a few degrees of rotation at the end of the forward rotation thereof.

6. Article handling apparatus comprising a member having a leading and trailing edge and an upper surface therebetween on which an article may be supported, means for moving said member along a prescribed path in a substantially horizontal plane, a platform disposed subjacent said horizontal plane and underlying the path of movement of said article support member, said platform lying intermediate the ends of said prescribed path, a wiper element traversing said prescribed path disposed above said horizontal plane and substantially overlying said platform, means for moving said element along an intermediate portion of said path and at a lesser speed than said support member, and said wiper element being disposed to intercept an article on said member as said member passes over said platform for sliding said article off from the trailing edge of said member and onto said platform.

7. Article handling and weighing apparatus comprising a vane member having a relatively flat upper surface on which an article may be placed for conveying the same with said surface having a trailing edge, means for rotating said vane member about a substantially vertical axis, a scale platform disposed substantially immediately subjacent the path of movement of said vane member medially of the ends of said path, a wiper element extending generally radially across said path and disposed vertically above the horizontal plane of said vane member surface, means for rotating said wiper element with said vane member but at a lesser speed along said path whereby said vane member will pass subjacent said wiper element substantially immediately above said scale platform and an article on said vane member will be intercepted and fall from the trailing edge thereof.

8. Apparatus as set forth in claim 7 including means for suddenly accelerating rotation of said wiper element after said vane member has passed said element.

9. Apparatus of the character described comprising a member having an upper surface on which an article may be supported, said surface having a trailing edge, means for moving said member along a prescribed path in a substantially horizontal plane, a scale including a scale platform disposed subjacent said horizontal plane and underlying the path of movement of said article support member, said platform lying intermediate the ends of said prescribed path, a wiper element traversing said prescribed path disposed above said horizontal plane and substantially overlying said platform, said wiper element being positioned to intercept an article on said support member as said member passes between said element and said scale platform for causing said article to fall from the trailing edge of said surface and depositing said article onto said platform, and plunger means movable across said prescribed path and over said scale platform for sliding articles off from the platform.

10. Article handling and weighing apparatus including a member having an upper surface on which an article may be supported, means for intermittently moving said member from a first receiving position to a second horizontally spaced position, a scale platform disposed subjacent said member and between said two positions, means for transferring an article from said member to said platform including a wiper element overlying said member and movable therewith at a lower speed so as to intercept the leading edge of an article on said member and urge the article onto said scale platform, and plunger means for sliding an article from said platform along a path generally normal to the path of movement of said member between said two positions.

11. Article handling and weighing apparatus comprising a vane member having a relatively flat upper surface on which an article may be placed for conveying the same, said surface terminating in a trailing edge means for rotating said vane member about a substantially vertical axis, a scale platform disposed substantially immediately subjacent the path of movement of said vane member medially of the ends of said path, a wiper element extending generally radially across said path and disposed vertically above the horizontal plane of said vane member surface whereby said vane member may pass between said wiper element and said platform for intercepting an article on said surface and causing the same to fall from said trailing edge and be deposited on said platform, plunger means extending generally radially across said path and aligned with said platform, and means for advancing said plunger means across said platform after said vane member has passed over the same.

12. Apparatus as set forth in claim 11 including means for selectively varying the length of travel of said plunger means.

13. Apparatus as set forth in claim 11 in which said plunger means is normally disposed in radial spaced relation to said platform, and means for returning said plunger means to said spaced relation after said advancing movement thereof.

14. Apparatus of the character described including a member having an upper surface on which an article may be supported, said surface having a trailing edge means for moving said member along a prescribed path in a substantially horizontal plane, a scale including a scale platform disposed subjacent said horizontal plane and underlying the path of movement of said article support member, said platform lying intermediate the ends of said prescribed path, a wiper element traversing said prescribed path disposed above said horizontal plane and substantially overlying said platform, said wiper element intercepting articles on said support member as the latter passes between said element and platform for transferring articles off from the trailing edge of the member onto the platform, a bag mandrel disposed adjacent an edge of said platform out of the path of movement of said member, plunger means adjacent the opposing edge of said platform, and means for moving said plunger means across said platform towards said mandrel.

15. Apparatus as set forth in claim 14 in which said bag mandrel includes a pair of cooperating relatively movable sections, means actuable to cause relative separation of said sections upon initial movement of said member and for effecting relative closing of said sections after movement of said plunger means.

16. Article handling and weighing apparatus comprising a vane member having a trailing edge and a relatively flat upper surface on which an article may be placed for conveying the same, means for rotating said vane member about a substantially vertical axis, a scale platform disposed substantially immediately subjacent the path of movement of said vane member medially of the ends of said path, a wiper element extending generally radially across said path and disposed vertically above the horizontal plane of said vane member surface, means for rotating said wiper element with said vane member but at a lesser speed along said path whereby said vane member will pass said wiper element substantially immediately above said scale platform, a plunger mounted for longitudinal movement over said scale platform, means for advancing and retracting said plunger along a path generally radial of said vane member path of movement, a bag mandrel including a pair of cooperating sections adjacent said scale platform and in alignment with said plunger, and means effecting relative separation of said sections upon advancement of said plunger, for effecting limited closing of said sections as said plunger approaches its outermost advanced position and for fully closing said sections upon return movement of said plunger.

17. Apparatus as set forth in claim 16 in which vertically disposed pivotal mounting means are provided for each of said mandrel sections at the ends thereof adjacent said platform, and means interconnecting said mounting means for imparting symmetrical movement of the sections about said mounting means.

References Cited in the file of this patent

UNITED STATES PATENTS

| | | |
|---|---|---|
| 1,288,910 | Julius et al. | Dec. 24, 1918 |
| 1,904,198 | Brand | Apr. 18, 1933 |
| 2,324,930 | Joa | July 20, 1943 |
| 2,402,869 | Buchanan et al. | June 25, 1946 |
| 2,452,666 | Kuther et al. | Nov. 2, 1948 |
| 2,551,199 | Bosus | May 1, 1951 |
| 2,552,620 | Christian | May 15, 1951 |
| 2,597,364 | Nash | May 20, 1952 |
| 2,661,091 | Maloney | Dec. 1, 1953 |
| 2,713,449 | Carmichael | July 19, 1955 |
| 2,747,352 | Whitecar | May 29, 1956 |
| 2,753,673 | Olive | July 10, 1956 |
| 2,760,620 | Hull et al. | Aug. 28, 1956 |